UNITED STATES PATENT OFFICE 2,636,030

COPPER-CONTAINING DISAZO DYESTUFFS

Ernst Keller, Basel, Switzerland, assignor to J. R. Geigy A. G., Basel, Switzerland, a Swiss firm No Drawing. Application June 14, 1951, Serial No. 231,655. In Switzerland June 29, 1950

6 Claims. (Cl. 260—148)

This invention concerns the production of copper-containing disazo dyestuffs of the stilbene series which dye cellulose fibres in green to blue shades with good fastness properties, in particular with very good fastness to light.

According to the present invention very valuable copper-containing disazo dyestuffs of the stilbene series are obtained in the following way. A diazotised 4-amino-4'-nitrostilbene-2.2'-disulphonic acid is coupled with a 1-amino-2-alkoxynaphthalene sulphonic acid which is capable of being coupled to the amino group in the paraposition. The aminoazo dyestuff so obtained is further diazotised and coupled with a hydroxynaphthalene compound which is capable of being coupled in the ortho-position to the hydroxyl group and which may contain other substituents usual in azo dyestuffs, to produce the disazo dyestuff of the general formula:

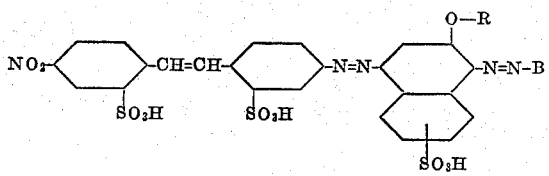

wherein

R represents a lower substituted or unsubstituted alkyl radical and
B represents an o-hydroxynaphthalene radical, if desired still further substituted.

Finally, the disazo dyestuff is treated with copper-containing substances by methods known per se and so converted into the corresponding copper compound.

Preferably 1-amino-2-alkoxynaphthalene-6-sulphonic acids with a lower unsubstituted alkyl radical, for instance the methyl or ethyl radical, and also, if desired, with a lower substituted alkyl radical, in this case preferably the carboxymethyl radical, in the alkoxy group can be considered as middle components in the process according to this invention. The derivatives of 2-amino-5-hydroxynaphthalene-7-sulphonic acid and those of 2-amino-6-hydroxynaphthalene-8-sulphonic acid can be most advantageously used as end components of the hydroxynaphthalene compounds capable of being coupled in the ortho position to the hydroxyl group according to the present invention, e. g. derivatives phenylated or acylated at the nitrogen atom. By this latter may be understood: compounds which contain the radicals of aliphatic carboxylic acids or of aromatic carboxylic acids of the benzene series or of carbonic acid half esters or half amides. Also, further substituted derivatives should be included in the aliphatic or aromatic radicals. The dyestuffs according to this invention with 2-hydroxynaphthalene as end component are also a valuable group.

The disazo dyestuffs according to the invention are coppered by methods known per se by treatment with copper-producing agents preferably in an aqueous solution or suspension at raised temperature. Coppering is most advantageously performed with cupric-tetramine salts which can contain ammonia as well as lower organic amines as amines.

The copper-containing disazo dyestuffs of the stilbene series according to this invention are in the form of a dark powder which is soluble in water with a green to blue-green colour and, in spite of the nitro group which generally has an unfavourable effect in direct dyestuffs, some of them have a surprising affinity for vegetable fibres.

They are distinguished from previously known dyestuffs not only by the more easy availability of their starting products but also by an even better fastness to light and some of them by their purer shades or better fastness to acid or alkali.

The following examples illustrate the invention without limiting it in any way. Where not otherwise stated, parts are given as parts by weight and the temperatures are in degrees centigrade. The relationship of parts by weight to parts by volume is that of kilogrammes to litres.

Example 1

40 parts of 4-nitro-4'-aminostilbene-2.2'-disulphonic acid are diazotised in the usual way and the diazo compound is run into a weakly acid to litmus solution of 25.3 parts of 1-amino-2-methoxynaphthalene-6-sulphonic acid. On completion of the coupling, the aminoazo dyestuff is further diazotised at a temperature of 16–20°. After a few hours the diazo compound is coupled with 31.5 parts of 2-phenylamino-5-hydroxynaphthalene-7-sulphonic acid in the presence of pyridine in a soda alkaline solution. On completion of the coupling, the disazo dyestuff so formed is salted out, isolated and purified by thorough washing or dissolving and recrystallization. The purified dyestuff is then converted into the copper complex compound by one of the known methods for example as follows: a solution of 50 parts of concentrated ammonia and 25 parts of crystallised copper sulphate in 100 parts of water is added to a hot aqueous solution of the dyestuff. This solution is then heated for 16–20 hours at 90–95°, the copper complex so formed is isolated by salting out and then it is dried.

The dried dyestuff is in the form of a dark powder which dissolves in water with a green colour and dyes cellulose fibres in dark green shades of very good fastness to light.

Other dyestuffs with very similar properties are obtained if in the above example 2-(4'-methoxyphenyl)-amino-5-hydroxynaphthalene-7-sulphonic acid or 2-(4'-ethoxyphenyl)-amino-5-hydroxynaphthalene-7-sulphonic acid is used instead of 2-phenylamino-5-hydroxynaphthalene-7-sulphonic acid.

*Example 2*

40 parts of 4-nitro-4'-aminostilbene-2.2'-disulphonic acid are diazotised in the usual way and the diazo compound is coupled with 27 parts of 1-amino-2-ethoxynaphthalene-6-sulphonic acid in a weakly acid medium as described in Example 1. The monoazo dyestuff so formed is further diazotised at 16–20° for several hours. The diazo compound is precipitated with a little potassium chloride, filtered off and washed with water. It is stirred into water and then poured at 0–3° into a soda alkaline solution of 34 parts of 2-benzoylamino-5-hydroxynaphthalene-7-sulphonic acid which contains about 10% by volume of pyridine. On completion of the coupling, the disazo dyestuff formed is salted out, isolated and purified by washing. The dyestuff is then converted into the metal complex by coppering in an ammonia solution as described in Example 1.

The metallised dyestuff is a dark powder which dissolves in water giving a blue-green shade which is very fast to light.

Further dyestuffs with very similar properties are obtained if in the above example the 2-benzoylamino-5-hydroxynaphthalene-7-sulphonic acid is replaced by the following components:

2-(3'-aminobenzoyl)-amino-5-hydroxynaphthalene-7-sulphonic acid, 2-(4'-aminobenzoyl)-amino-5-hydroxynaphthalene-7-sulphonic acid, 2-(4'-methylbenzoyl)-amino-5-hydroxynaphthalene-7-sulphonic acid, 2-carbomethoxyamino-5-hydroxynaphthalene-7-sulphonic acid, the condensation product from 1 mol of 2-amino-5-hydroxynaphthalene-7-sulphonic acid with 1 mol of cyanuric chloride, 1 mol of metanilic acid and 1 mol of aniline, the condensation product from 1 mol of 2-amino-5-hydroxynaphthalene-7-sulphonic acid with 1 mol of cyanuric chloride and 1 mol of m-aminobenzoic acid, the urea from 4-amino acetanilide and 2-amino-5-hydroxynaphthalene-7-sulphonic acid.

*Example 3*

The diazo compound of the monoazo dyestuff described in Example 1 is added at 0–3° to to an ammonia solution of 35 parts of 2-benzoylamino-6-hydroxynaphthalene-8-sulphonic acid which contains about 10% by volume of pyridine. On completion of the coupling, the dyestuff is salted out, isolated and washed. The diazo dyestuff in ammonia solution is then converted into the copper complex as described in Example 1. The dried dyestuff is a dark powder which dissolves in water with a green colour and dyes cellulose fibres in green shades which have excellent light fastness properties.

A similar dyestuff, but one which draws rather less well is obtained if 2-acetylamino-6-hydroxynaphthalene-8-sulphonic acid or 2-(4'-aminobenzoyl)-amino-6-hydroxynaphthalene-3-sulphonic acid is used instead of 2-benzoylamino-6-hydroxynaphthalene-8-sulphonic acid.

*Example 4*

The monoazo dyestuff produced from 40 parts of 4-nitro-4'-aminostilbene-2.2'-disulphonic acid as described in Example 1 is converted into the diazo compound and added, in the presence of soda and 10% by volume of pyridine to a sodium naphtholate solution which contains 14.5 parts of β-naphthol. On completion of the coupling, the dyestuff is salted out, and then filtered and washed until the filtrate which was brown at first is clear. It is then advantageous to convert the diazo dyestuff so formed, in ammonia solution, into the copper complex. The dried dyestuff is a dark powder which dissolves in water with a green-blue colour and dyes cellulose fibres in dark green shades which are very fast to light.

*Example 5*

6.4 parts of the diazotised monoazo dyestuff produced by coupling 4-diazo-4'-nitrostilbene-2.2'-disulphonic acid with 1-amino-2-methoxynaphthalene-6-sulphonic acid are added at 0–3° to a soda alkaline solution of 37.2 parts of 2-(4'-acetylaminophenyl)-amino-5-hydroxynaphthalene-7-sulphonic acid in the presence of 10% by volume of pyridine. On completion of the coupling, the dyestuff is salted out, washed and converted into the copper compound in the usual way. The dried metallised dyestuff is a dark powder which dissolves in water with a green colour and dyes cellulose fibres in dark green shades which are very fast to light. A dyestuff with similar properties is obtained if in the above example 2-(4'-benzoylaminophenyl)-amino-5-hydroxynaphthalene-7-sulphonic acid or 2-(4'-carboethoxyaminophenyl)-amino-5-hydroxynaphthalene-7-sulphonic acid is used instead of 2-(4'-acetylaminophenyl)-amino-5-hydroxynaphthalene-7-sulphonic acid.

*Example 6*

67.6 parts of the diazotised monoazo dyestuff produced by coupling 4-diazo-4'-nitrostilbene-2.2'-disulphonic acid with 1-amino-2-ethoxynaphthalene-6-sulphonic acid are added at 0–3° to a soda alkaline solution of 22.5 parts of 2-hydroxynaphthalene-6-sulphonic acid in the presence of 10% by volume of pyridine. On completion of the coupling, the dyestuff is isolated and washed until the filtrate is clear. The dyestuff dissolved in hot water is then heated to 80–85° with 25 parts of crystallised copper sulphate and 60 parts of conc. ammonia for about 4 hours and then boiled for a further 15–20 hours. The copper complex so formed is salted out and isolated. When dried it forms a dark powder which dissolves in water with a blue colour and dyes cellulose fibres in blue-green shades which are very fast to light.

What I claim is:

1. The complex copper compound of a disazo dyestuff having the general formula:

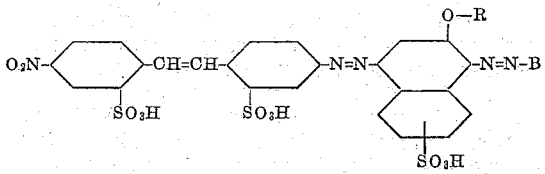

wherein

R represents a lower alkyl radical and

B represents a naphthalene nucleus containing an OH group in the o-position to the azo group.

2. The complex copper compound of a disazo dyestuff having the formula:

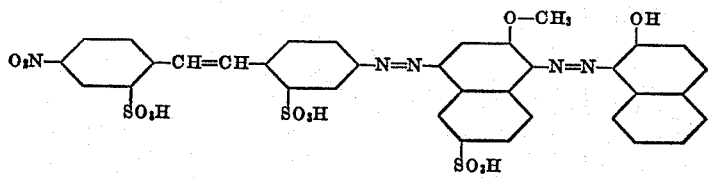

3. The complex copper compound of a disazo dyestuff having the formula:

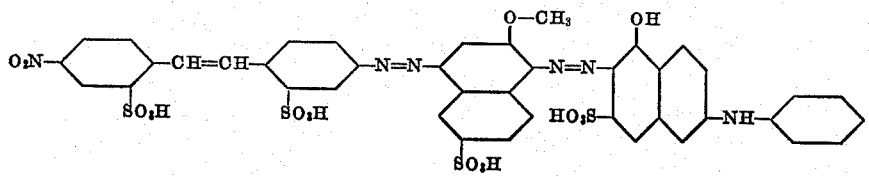

4. The complex copper compound of a disazo dyestuff having the formula:

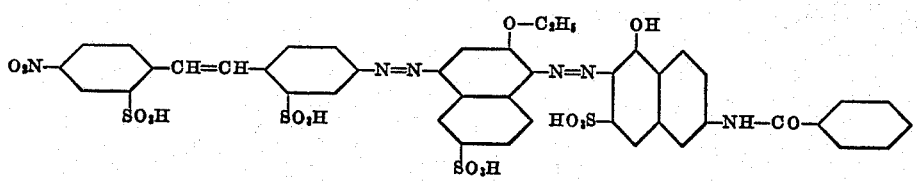

5. The complex copper compound of a disazo dyestuff having the formula:

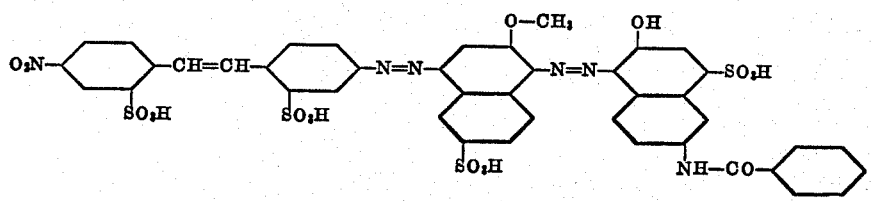

6. The complex copper compound of a disazo dyestuff having the formula:

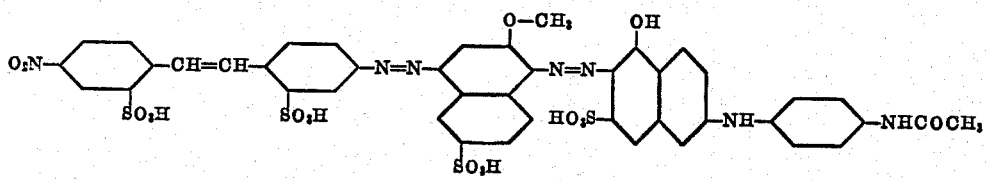

ERNST KELLER.

References Cited in the file of this patent
UNITED STATES PATENTS

| Number | Name | Date |
|---|---|---|
| 2,123,748 | Schindhelm | July 12, 1938 |
| 2,175,815 | Schindhelm | Oct. 10, 1939 |